(12) United States Patent
Zhu

(10) Patent No.: US 12,727,034 B2
(45) Date of Patent: Sep. 1, 2026

(54) METHOD AND APPARATUS FOR CONFIGURING PHYSICAL RANDOM ACCESS CHANNEL (PRACH)

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 303 days.

(21) Appl. No.: 18/552,583

(22) PCT Filed: Mar. 26, 2021

(86) PCT No.: PCT/CN2021/083411
§ 371 (c)(1),
(2) Date: Sep. 26, 2023

(87) PCT Pub. No.: WO2022/198668
PCT Pub. Date: Sep. 29, 2022

(65) Prior Publication Data

US 2024/0179754 A1 May 30, 2024

(51) Int. Cl.
*H04W 74/0833* (2024.01)
*H04L 5/00* (2006.01)

(52) U.S. Cl.
CPC ....... *H04W 74/0833* (2013.01); *H04L 5/0053* (2013.01)

(58) Field of Classification Search
CPC . H04W 74/00; H04W 74/002; H04W 74/006; H04W 74/08; H04W 74/0833; H04W 74/0836; H04L 5/00; H04L 5/003; H04L 5/0053; H04L 5/0078; H04L 5/0082; H04L 5/0091; H04L 5/0094
See application file for complete search history.

(56) References Cited

U.S. PATENT DOCUMENTS

2019/0200248 A1 6/2019 Basu Mallick et al.
2022/0182160 A1* 6/2022 Su ........................ H04B 17/309
(Continued)

FOREIGN PATENT DOCUMENTS

CN 108271274 A 7/2018
CN 109788548 A 5/2019
(Continued)

OTHER PUBLICATIONS

Kodheli et al., "Random Access Procedure Over Non-Terrestrial Networks: From Theory to Practice", Jul. 30, 2021, IEEE, IEEE Access ( vol. 9), pp. 109130-109143, DOI: 10.1109/ACCESS.2021.3101291 (Year: 2021).*
(Continued)

*Primary Examiner* — Paul H. Masur
(74) *Attorney, Agent, or Firm* — Oblon, McClelland, Maier & Neustadt, L.L.P.

(57) ABSTRACT

A method for configuring a physical random access channel (PRACH), performed by a network device, where the method includes: sending PRACH configuration information to a terminal device in a specified region, wherein the PRACH configuration information comprises a PRACH format and a time advance for a PRACH sending time relative to downlink frame timing of the terminal device.

20 Claims, 7 Drawing Sheets

201

Sending PRACH configuration information to a terminal device in a specified region, where the PRACH configuration information includes a PRACH format and a time advance for a PRACH sending time relative to downlink frame timing of the terminal device

(56) References Cited

U.S. PATENT DOCUMENTS

| | | | | |
|---|---|---|---|---|
| 2022/0264662 | A1* | 8/2022 | Xu | H04B 7/18558 |
| 2023/0076690 | A1* | 3/2023 | Miao | H04B 7/18563 |

FOREIGN PATENT DOCUMENTS

| | | | |
|---|---|---|---|
| CN | 111344959 | A | 6/2020 |
| CN | 111565448 | A | 8/2020 |

OTHER PUBLICATIONS

International Search Report issued Dec. 30, 2021 in PCT/CN2021/083411, filed on Mar. 26, 2021, citing documents 1 & 15-17 therein, 4 pages (with English Abstract).

Chinese Office Action issued Apr. 21, 2023 in Chinese Application 202180000866.0, citing documents 1, 15-16 & 18 6 pages.

* cited by examiner

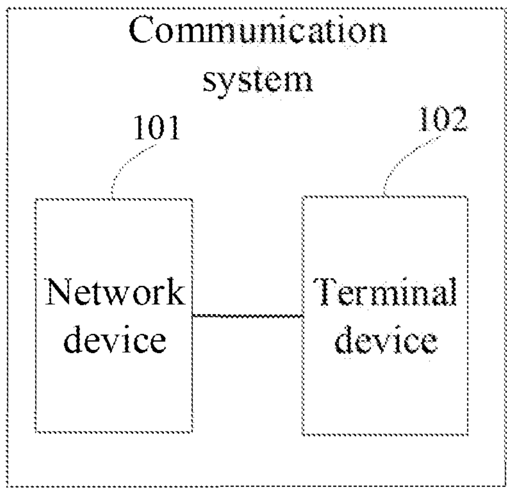

Sending PRACH configuration information to a terminal device in a specified region, where the PRACH configuration information includes a PRACH format and a time advance for a PRACH sending time relative to downlink frame timing of the terminal device

Sending PRACH configuration information to a terminal device in a region of a specified cell by using broadcast signaling, where the PRACH configuration information includes a PRACH format and a time advance for a PRACH sending time relative to downlink frame timing of the terminal device

Sending PRACH configuration information to a terminal device in a region of a specified cell by using multicast signaling, where the PRACH configuration information includes a PRACH format and a time advance for a PRACH sending time relative to downlink frame timing of the terminal device

Sending PRACH configuration information to a terminal device in a region of a specified cell by using dedicated signaling of the terminal device, where the PRACH configuration information includes a PRACH format and a time advance for a PRACH sending time relative to downlink frame timing of the terminal device

Sending PRACH configuration information to a terminal device in a coverage region of a specified beam by using broadcast signaling, where the PRACH configuration information includes a PRACH format and a time advance for a PRACH sending time relative to downlink frame timing of the terminal device

Sending PRACH configuration information to a terminal device in a coverage region of a specified beam by using multicast signaling, where the PRACH configuration information includes a PRACH format and a time advance for a PRACH sending time relative to downlink frame timing of the terminal device

Sending PRACH configuration information to a terminal device in a coverage region of a specified beam by using dedicated signaling of the terminal device, where the PRACH configuration information includes a PRACH format and a time advance for a PRACH sending time relative to downlink frame timing of the terminal device

Sending PRACH configuration information to a terminal device in a positioning region of a specified terminal device by using broadcast signaling, where the PRACH configuration information includes a PRACH format and a time advance for a PRACH sending time relative to downlink frame timing of the terminal device

Sending PRACH configuration information to a terminal device in a positioning region of a specified terminal device by using multicast signaling, where the PRACH configuration information includes a PRACH format and a time advance for a PRACH sending time relative to downlink frame timing of the terminal device

Sending PRACH configuration information to a terminal device in a positioning region of a specified terminal device by using dedicated signaling of the terminal device, where the PRACH configuration information includes a PRACH format and a time advance for a PRACH sending time relative to downlink frame timing of the terminal device

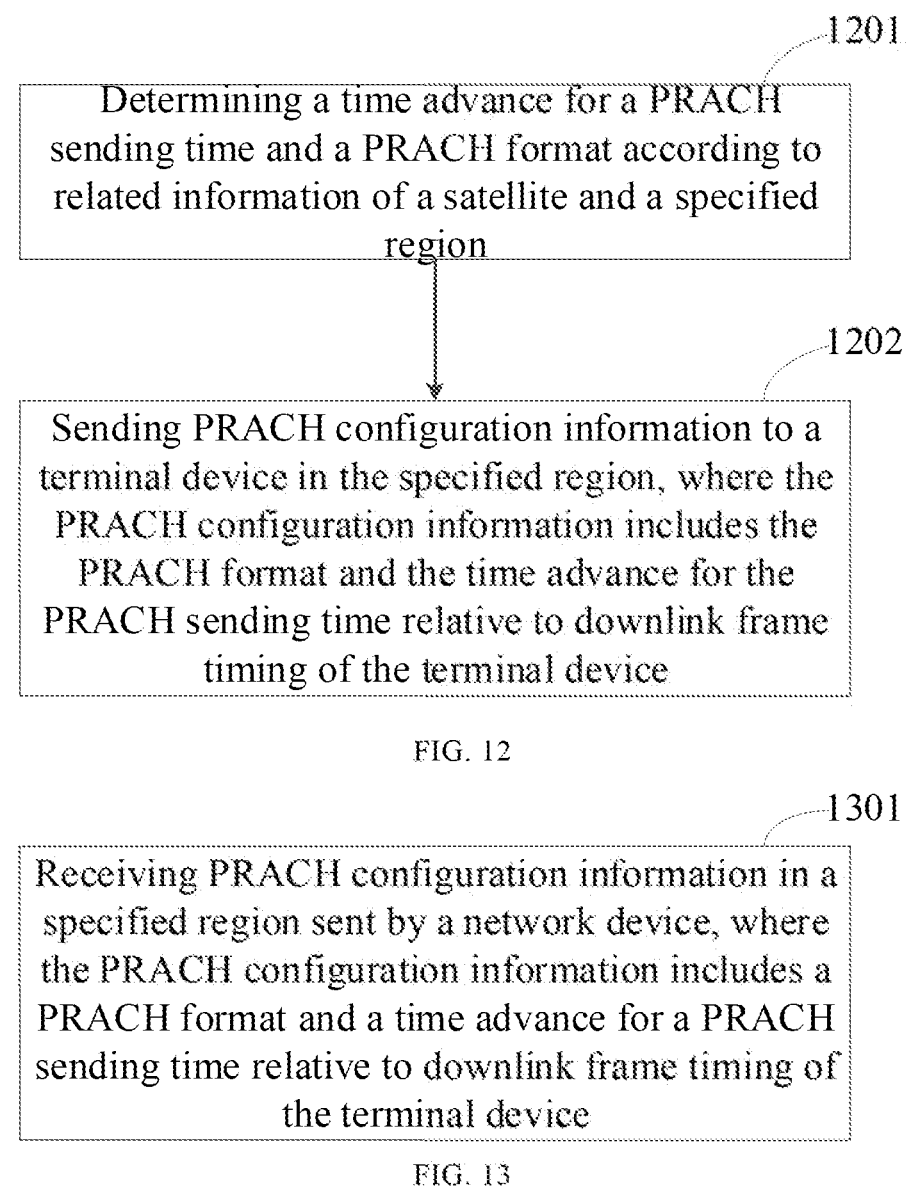

Determining a time advance for a PRACH sending time and a PRACH format according to related information of a satellite and a specified region

1202

Sending PRACH configuration information to a terminal device in the specified region, where the PRACH configuration information includes the PRACH format and the time advance for the PRACH sending time relative to downlink frame timing of the terminal device

Receiving PRACH configuration information in a specified region sent by a network device, where the PRACH configuration information includes a PRACH format and a time advance for a PRACH sending time relative to downlink frame timing of the terminal device

FIG. 13

METHOD AND APPARATUS FOR CONFIGURING PHYSICAL RANDOM ACCESS CHANNEL (PRACH)

CROSS REFERENCE TO RELATED APPLICATIONS

The present disclosure is a U.S. National Stage of International Application No. PCT/CN2021/083411, filed on Mar. 26, 2021, all contents of which are incorporated herein by reference in their entireties for all purposes.

BACKGROUND

Technical Field

The present disclosure relates to the field of communication technology, and in particular, to a method and an apparatus for configuring a physical random access channel (PRACH).

Description of the Related Art

In a wireless communication technology, for example, in a satellite communication technology, a satellite is used as a node to implement communication between a terminal device and a network device. The distance between the satellite and the terminal device and the distance between the satellite and the network device are long, resulting in a long round trip delay between the terminal device and the network device.

SUMMARY

According to a first aspect, there is provided a method for configuring a physical random access channel (PRACH) according to some embodiments of the present disclosure, performed by a network device. The method includes sending PRACH configuration information to a terminal device in a specified region, where the PRACH configuration information includes a PRACH format and a time advance for a PRACH sending time relative to downlink frame timing of the terminal device.

According to a second aspect, there is provided another method for configuring a physical random access channel (PRACH) according to some embodiments of the present disclosure, performed by a terminal device in a specified region. The method includes receiving PRACH configuration information in the specified region sent by a network device, where the PRACH configuration information includes a PRACH format and a time advance for a PRACH sending time relative to downlink frame timing of the terminal device.

According to a third aspect, there is provided an apparatus for configuring a physical random access channel (PRACH) according to some embodiments of the present disclosure. The apparatus includes a processor and a memory, and the memory stores with a computer program. The processor executes the computer program stored in the memory to enable the apparatus to execute the method according to the first aspect.

According to a fourth aspect, there is provided an apparatus for configuring a physical random access channel (PRACH) according to some embodiments of the present disclosure. The apparatus includes a processor and a memory, and the memory stores with a computer program. The processor executes the computer program stored in the memory to enable the apparatus to execute the method according to the second aspect.

According to a fifth aspect, there is provided a non-transitory computer-readable storage medium according to an embodiment of the present disclosure, which is configured to store an instruction used by the network device. When the instruction is executed, the network device is enabled to execute the method according to the first aspect.

According to a sixth aspect, there is provided a non-transitory computer-readable storage medium according to an embodiment of the present disclosure, which is configured to store an instruction used by the terminal device. When the instruction is executed, the terminal device is enabled to execute the method according to the second aspect.

BRIEF DESCRIPTION OF THE DRAWINGS

In order to more clearly illustrate the technical solutions in the embodiments of the present disclosure or in the background, accompanying drawings needed to be used in the embodiments of the present disclosure or in the background technology are described below.

FIG. 1 is a schematic architectural diagram of a communication system according to some embodiments of the present disclosure;

FIG. 2 is a schematic flowchart of a method for configuring a physical random access channel (PRACH) according to some embodiments of the present disclosure;

FIG. 3 is a schematic flowchart of another method for configuring a physical random access channel (PRACH) according to some embodiments of the present disclosure;

FIG. 4 is a schematic flowchart of another method for configuring a physical random access channel (PRACH) according to some embodiments of the present disclosure;

FIG. 5 is a schematic flowchart of another method for configuring a physical random access channel (PRACH) according to some embodiments of the present disclosure;

FIG. 6 is a schematic flowchart of another method for configuring a physical random access channel (PRACH) according to some embodiments of the present disclosure;

FIG. 7 is a schematic flowchart of another method for configuring a physical random access channel (PRACH) according to some embodiments of the present disclosure;

FIG. 8 is a schematic flowchart of another method for configuring a physical random access channel (PRACH) according to some embodiments of the present disclosure;

FIG. 9 is a schematic flowchart of another method for configuring a physical random access channel (PRACH) according to some embodiments of the present disclosure;

FIG. 10 is a schematic flowchart of another method for configuring a physical random access channel (PRACH) according to some embodiments of the present disclosure;

FIG. 11 is a schematic flowchart of another method for configuring a physical random access channel (PRACH) according to some embodiments of the present disclosure;

FIG. 12 is a schematic flowchart of another method for configuring a physical random access channel (PRACH) according to some embodiments of the present disclosure;

FIG. 13 is a schematic flowchart of another method for configuring a physical random access channel (PRACH) according to some embodiments of the present disclosure;

DETAILED DESCRIPTION OF THE PREFERRED EMBODIMENTS

Figure 14:
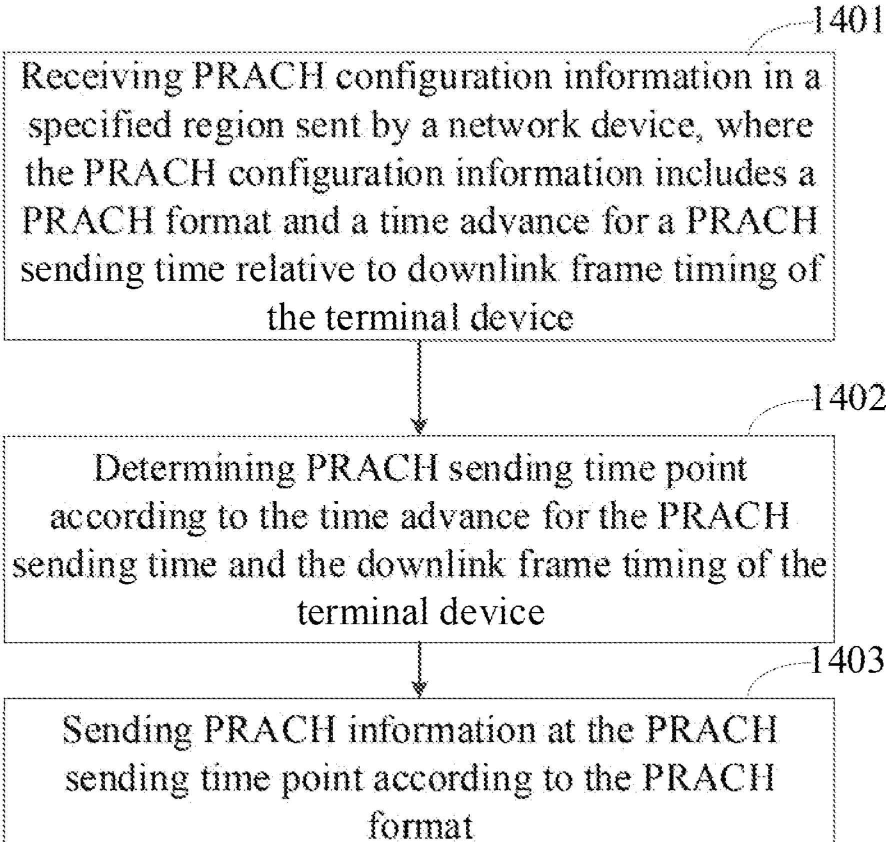
FIG. 14 is a schematic flowchart of another method for configuring a physical random access channel (PRACH) according to some embodiments of the present disclosure.

In order to better understand the method for configuring a physical random access channel (PRACH) disclosed in the embodiments of the present disclosure, a communication system applicable to the embodiments of the present disclosure is firstly described below.

Referring to FIG. 1, FIG. 1 is a schematic architectural diagram of a communication system according to some embodiments of the present disclosure. The communication system may include, but is not limited to, a network device and a terminal device. The number and morphology of the devices shown in FIG. 1 are examples and do not constitute a limitation on the embodiments of the present disclosure. Two or more network devices and two or more terminal devices may be included in the actual application. The communication system shown in FIG. 1 includes a network device 101 and a terminal device 102 as an example.

It should be noted that the technical solutions of the embodiments of the present disclosure may be applied to various communication systems, for example, a long term evolution (LTE) system, a 5th generation (5G) mobile communication system, a 50 new radio (NR) system, or other novel future mobile communication systems, etc.

The network device 101 in the embodiment of the present disclosure is an entity for transmitting or receiving signals on a network side. For example, the network device 101 may be an evolved NodeB (eNB), a transmission reception point (TRP), a next generation NodeB (gNB) in an NR system, a base station in other future mobile communication systems, or an access node in a wireless fidelity (WiFi) system. The specific technology and specific device morphology adopted by the network device are not limited in the embodiments of the present disclosure. The network device provided in the embodiments of the present disclosure may be composed of a central unit (CU) and a distributed unit (DU), where the CU may also be referred to as a control unit. The protocol layer of a network device, such as a base station, can be divided by using a CU-DU structure. Functions of part of the protocol layer are centrally controlled in the CU, functions of the remaining part or all of the protocol layer are distributed in the DU, and the DU is centrally controlled by the CU.

The terminal device 102 in the embodiment of the present disclosure is an entity for receiving or transmitting signals on a user side, such as a mobile phone. The terminal device may also be referred to as a terminal, user equipment (UE), a mobile station (MS), a mobile terminal (MT), etc. The terminal device may be a car having a communication function, a smart car, a mobile phone, a wearable device, a tablet computer (PAD), a computer with a wireless transceiving function, a virtual reality (VR) terminal device, an augmented reality (AR) terminal device, a wireless terminal device in industrial control, a wireless terminal device in self-driving, a wireless terminal device in remote medical surgery, a wireless terminal device in a smart grid, wireless terminal device in transportation safety, a wireless terminal device in a smart city, a wireless terminal device in smart home, and the like. The specific technology and the specific device morphology adopted by the terminal device are not limited in the embodiments of the present disclosure.

In the above communication system, when the terminal device accesses the network device, interference of users with different round trip delays is avoided relying on the cyclic prefix of a random access preamble. Under the condition that the round trip delay is large, the cyclic prefix length is very long, and the resource overhead is large.

In the embodiment of the present disclosure, by configuring a time advance for a PRACH sending time relative to downlink frame timing of the terminal device, the terminal device may send PRACH information to the network device in advance. By sending the PRACH information in advance, the cyclic prefix length is reduced, the resource is saved, and the resource overhead is reduced.

It can be understood that the communication system described in the embodiment of the present disclosure is to describe the technical solutions of the embodiments of the present disclosure more clearly, and does not constitute a limitation on the technical solutions provided in the embodiments of the present disclosure. It can be known to those of ordinary skill in the art that, with the evolution of the system architecture and the occurrence of a new service scenario, the technical solutions provided in the embodiments of the present disclosure are also applicable to similar technical problems.

The method and apparatus for configuring a physical random access channel (PRACH) provided by the present disclosure are described in detail below with reference to the accompanying drawings.

Referring to FIG. 2, FIG. 2 is a schematic flowchart of a method for configuring a physical random access channel (PRACH) according to some embodiments of the present disclosure. The method is applied to a network device in the communication system shown in FIG. 1. As shown in FIG. 2, the method may include, but is not limited to, the following step.

In step S201, PRACH configuration information is sent to a terminal device in a specified region, where the PRACH configuration information includes a PRACH format and a time advance for a PRACH sending time relative to downlink frame timing of the terminal device.

In the embodiment of the present disclosure, the specified region may include any one of the following regions: a region of a specified cell, a coverage region of a specified beam, and a positioning region of a specified terminal device. Among them, the specified region may be specified by the network device. For example, the network device may specify it randomly, or may specify it according to the sparse degree of the terminal devices in each cell, the difference between the round trip delays (RTD) of the terminal devices, and the like. For example, when the terminal devices in the cell are sparse and the difference between the RTDs of the terminal devices is not significant, the specified region may be the region of the cell; when the terminal devices in the cell are dense or the difference between the RTDs of the terminal devices is significant, the specified region may be the coverage region of each beam or the positioning region of the specified terminal device. Therefore, corresponding PRACH configuration information can be sent to regions of different levels according to needs, thereby reducing resource overhead.

Amon them, when the specified region is the region of the specified cell, all the terminal devices located in the region of the specified cell will receive shared PRACH configuration information; when the specified region is the coverage region of the specified beam, all the terminal devices located in the coverage region will receive shared PRACH configuration information; and when the specified region is the positioning region of the specified terminal device, the specified terminal device located in the positioning region will receive the PRACH configuration information.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, the PRACH format and the time advance for the PRACH sending time relative to the downlink frame timing of the terminal device may be sent simultaneously by using one piece of signaling; or, the PRACH format and the time advance for the PRACH sending time relative to the downlink frame timing of the terminal device may be sent respectively by using more than one piece of signaling.

In the embodiment of the present disclosure, the manner for the network device to send the PRACH configuration information to the terminal device in the specified region may include a variety of manners: broadcast signaling, multicast signaling, dedicated signaling of the terminal device, and the like. Among them, the broadcast signaling includes at least one of the following signaling: master information bock (MIB) broadcast signaling, or system information block (SIB) broadcast signaling. The multicast signaling includes at least one of the following signaling: multicast signaling carried on a physical downlink shared channel (PDSCH), or common downlink control information (DCI) multicast signaling carried on a physical downlink control channel (PDCCH). The dedicated signaling of the terminal device includes at least one of the following signaling: radio resource control (RRC) signaling, media access control control element (MAC CE) signaling, or common downlink control information (DCI) signaling.

By implementing the embodiments of the present disclosure, PRACH configuration information can be sent to a terminal device in a specified region, where the PRACH configuration information includes a PRACH format and a time advance for a PRACH sending time relative to downlink frame timing of the terminal device. By configuring the time advance for the PRACH sending time relative to the downlink frame timing of the terminal device, the terminal device may send PRACH information in advance. By sending the PRACH information in advance, the cyclic prefix length is reduced, the resource is saved, and the resource overhead is reduced.

Referring to FIG. 3, FIG. 3 is a schematic flowchart of another method for configuring a physical random access channel (PRACH) according to some embodiments of the present disclosure. The method is applied to a network device in the communication system shown in FIG. 1. As shown in FIG. 3, the method may include, but is not limited to, the following step.

In step S301, PRACH configuration information is sent to a terminal device in a region of a specified cell by using broadcast signaling, where the PRACH configuration information includes a PRACH format and a time advance for a PRACH sending time relative to downlink frame timing of the terminal device.

In the embodiment of the present disclosure, the network device may allocate the same radio network temporary identity (RNTI) for all the terminal devices located in the region of the specified cell, so that all the terminal devices located in the region of the specified cell will receive shared PRACH configuration information sent by the network device through broadcast signaling. Among them, the broadcast signaling includes at least one of the following signaling: master Information Block (MIB) broadcast signaling, or system information block (SIB) broadcast signaling.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and, the sequence length is the length of the random access preamble. In addition, it should be noted that the PRACH format may further include other format parameters, which are not limited herein, and may be set according to actual needs.

In the embodiment of the present disclosure, the PRACH format and the time advance for the PRACH sending time relative to the downlink frame timing of the terminal device may be sent simultaneously by using one piece of broadcast signaling; or, the PRACH format and the time advance for the PRACH sending time relative to the downlink frame timing of the terminal device may be sent respectively by using more than one piece of broadcast signaling.

By implementing the embodiments of the present disclosure, PRACH configuration information can be sent to a terminal device in a region of a specified cell by using broadcast signaling, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH information in advance. By sending the PRACH information in advance, the cyclic prefix length is reduced, the resource is saved, and the resource overhead is reduced.

Figures 4, 5, 6:
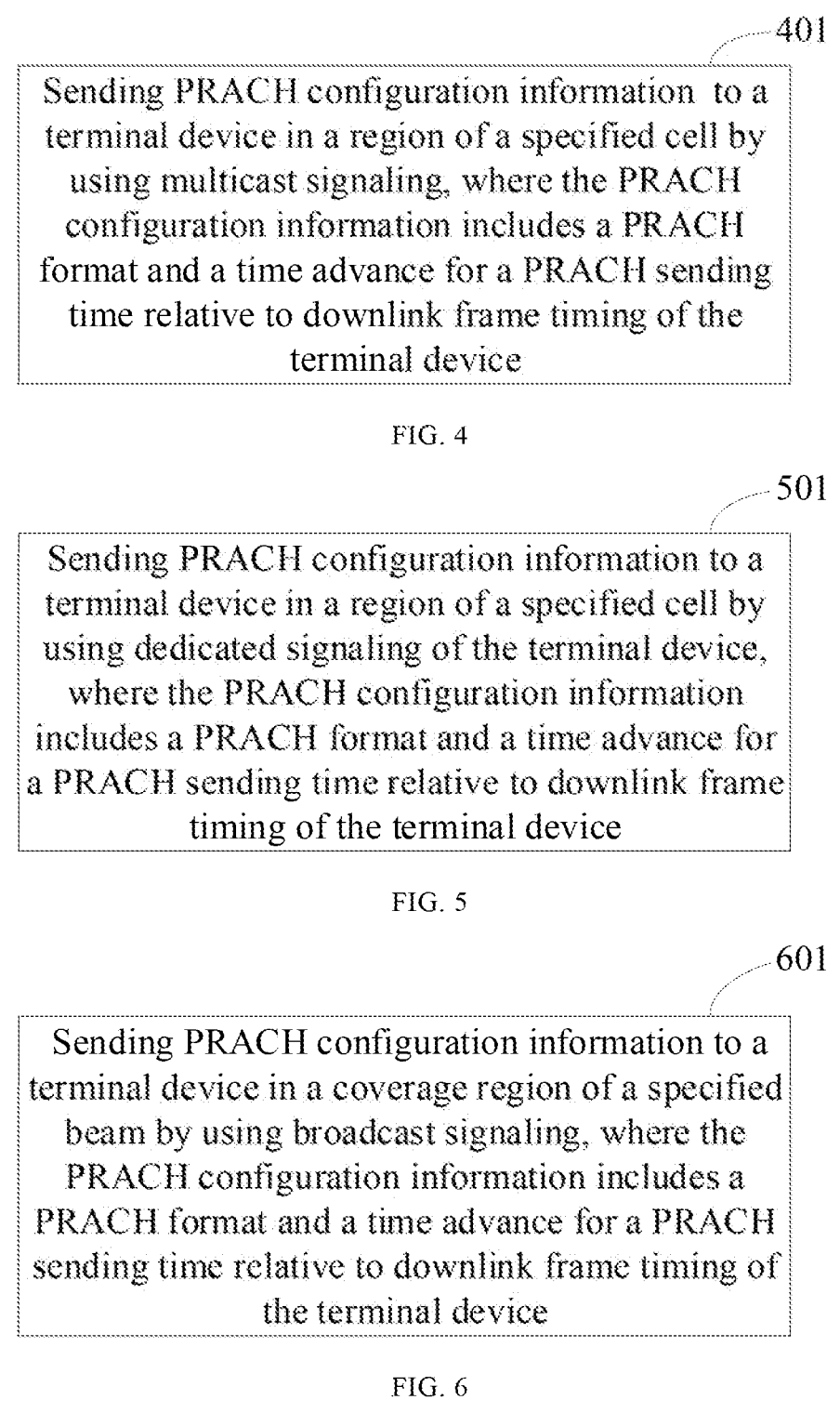

Referring to FIG. 4, FIG. 4 is a schematic flowchart of another method for configuring a physical random access channel (PRACH) according to some embodiments of the present disclosure. The method is applied to a network device in the communication system shown in FIG. 1. As shown in FIG. 4, the method may include, but is not limited to, the following step.

In step S401, PRACH configuration information is sent to a terminal device in a region of a specified cell by using multicast signaling, where the PRACH configuration information includes a PRACH format and a time advance for a PRACH sending time relative to downlink frame timing of the terminal device.

In the embodiment of the present disclosure, for each beam in the specified cell, the network device may allocate the same radio network temporary identity (RNTI) for the terminal devices in the coverage range of the beam, so that all the terminal devices located in the coverage range of the beam will receive shared PRACH configuration information sent by the network device through multicast signaling, thus the network device needs to respectively send multicast signaling for each beam in the specified cell. Among them, the multicast signaling includes at least one of the following signaling: multicast signaling carried on a physical downlink shared channel (PDSCH), or common downlink control information (DCI) multicast signaling carried on a physical downlink control channel (PDCCH).

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, for each beam in the specified cell, the PRACH format and the time advance for the PRACH sending time relative to the downlink frame timing of the terminal device may be sent simultaneously by using one piece of multicast signaling; or, the PRACH format and the time advance for the PRACH sending time relative to the downlink frame timing of the terminal device may be sent respectively by using more than one piece of multicast signaling.

By implementing the embodiments of the present disclosure, PRACH configuration information can be sent to a terminal device in a region of a specified cell by using multicast signaling, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH information in advance. By sending the PRACH information in advance, the cyclic prefix length is reduced, the resource is saved, and the resource overhead is reduced.

Referring to FIG. 5, FIG. 5 is a schematic flowchart of another method for configuring a physical random access channel (PRACH) according to some embodiments of the present disclosure. The method is applied to a network device in the communication system shown in FIG. 1. As shown in FIG. 5, the method may include, but is not limited to, the following step.

In step S501, PRACH configuration information is sent to a terminal device in a region of a specified cell by using dedicated signaling of the terminal device, where the PRACH configuration information includes a PRACH format and a time advance for a PRACH sending time relative to downlink frame timing of the terminal device.

In the embodiment of the present disclosure, for each terminal device in the specified cell, the network device may allocate a radio network temporary identity (RNTI) for the terminal device separately, so that the terminal device can receive the PRACH configuration information sent by the network device through the dedicated signaling of the terminal device, thus the network device needs to respectively send the dedicated signaling of the terminal device for each terminal device in the specified cell. Among them, the dedicated signaling of the terminal device includes at least one of the following signaling: radio resource control (RRC) signaling, media access control control element (MAC CE) signaling, or downlink control information (DCI) signaling.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, for each terminal device in the specified cell, the PRACH format and the time advance for the PRACH sending time relative to the downlink frame timing of the terminal device may be sent simultaneously by using one piece of dedicated signaling of the terminal device, or, the PRACH format and the time advance for the PRACH sending time relative to the downlink frame timing of the terminal device may be sent respectively by using more than one piece of dedicated signaling of the terminal device.

By implementing the embodiments of the present disclosure, PRACH configuration information may be sent to a terminal device in a region of a specified cell by using dedicated signaling of the terminal device, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH information in advance. By sending the PRACH information in advance, the cyclic prefix length is reduced, the resource is saved, and the resource overhead is reduced.

Referring to FIG. 6, FIG. 6 is a schematic flowchart of another method for configuring a physical random access channel (PRACH) according to some embodiments of the present disclosure. The method is applied to a network device in the communication system shown in FIG. 1. As shown in FIG. 6, the method may include, but is not limited to, the following step.

In step S601, PRACH configuration information is sent to a terminal device in a coverage region of a specified beam by using broadcast signaling, where the PRACH configuration information includes a PRACH format and a time advance for a PRACH sending time relative to downlink frame timing of the terminal device.

In the embodiment of the present disclosure, the network device may allocate the same radio network temporary identity (RNTI) for all the terminal devices located in the coverage region of the specified beam, so that all the terminal devices located in the coverage region of the specified beam will receive shared PRACH configuration information sent by the network device through broadcast signaling. Among them, the broadcast signaling includes at least one of the following signaling: master information block (MIB) broadcast signaling, or system information block (SIB) broadcast signaling.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, the PRACH format and the time advance for the PRACH sending time relative to the downlink frame timing of the terminal device may be sent simultaneously by using one piece of broadcast signaling; or, the PRACH format and the time advance for the PRACH sending time relative to the downlink frame timing of the terminal device may be sent respectively by using more than one piece of broadcast signaling.

By implementing the embodiments of the present disclosure, PRACH configuration information can be sent to a terminal device in a coverage region of a specified beam by using broadcast signaling, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH information in advance. By sending the PRACH information in advance, the cyclic prefix length is reduced, the resource is saved, and the resource overhead is reduced.

Figures 7, 8, 9:
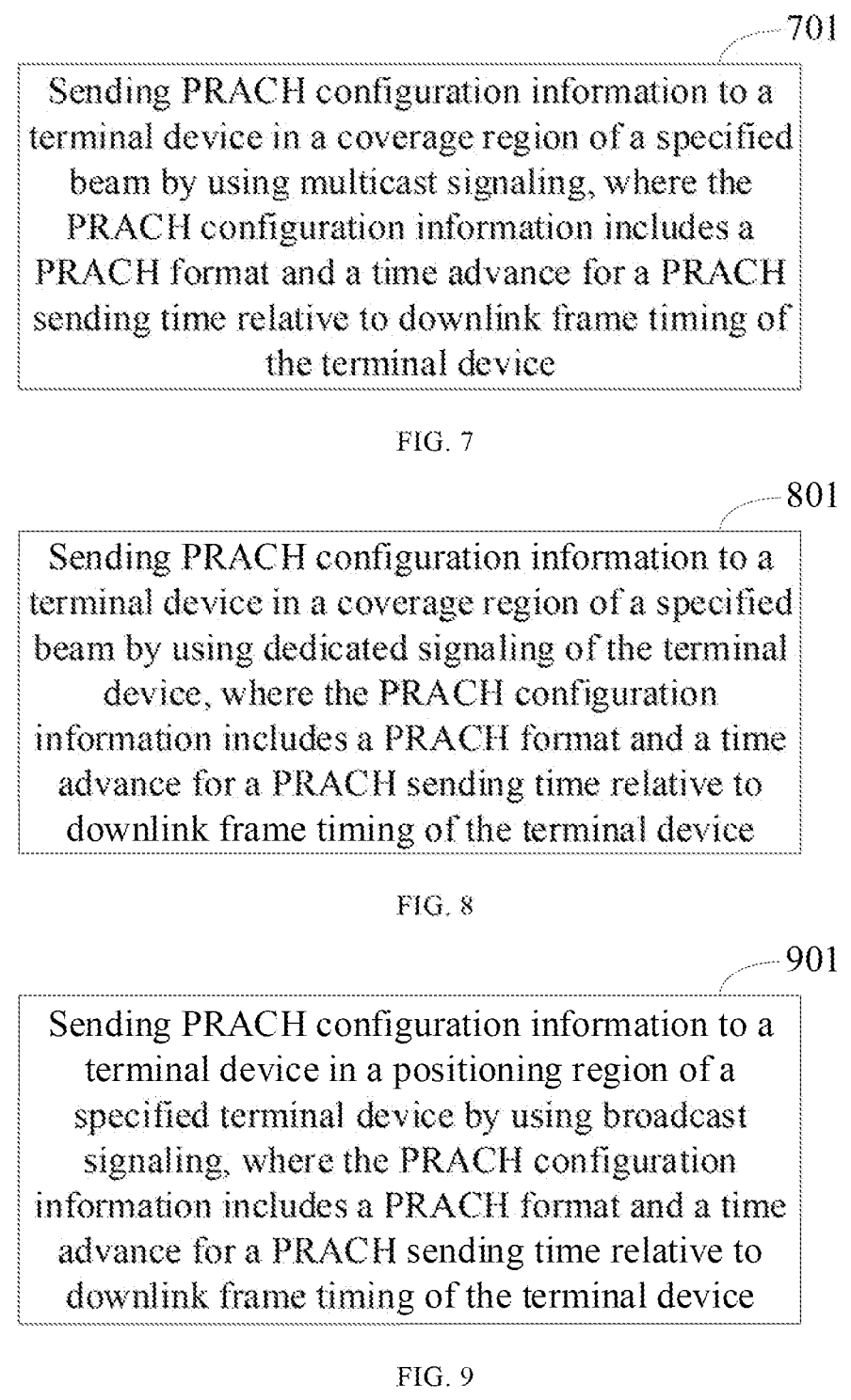

Referring to FIG. 7, FIG. 7 is a schematic flowchart of another method for configuring a physical random access channel (PRACH) according to some embodiments of the present disclosure. The method is applied to a network device in the communication system shown in FIG. 1. As shown in FIG. 7, the method may include, but is not limited to, the following step.

In step S701, PRACH configuration information is sent to a terminal device in a coverage region of a specified beam by using multicast signaling, where the PRACH configuration information includes a PRACH format and a time advance for a PRACH sending time relative to downlink frame timing of the terminal device.

In the embodiment of the present disclosure, for the specified beam, the network device may allocate the same radio network temporary identity (RNTI) for the terminal devices in the coverage range of the beam, so that all the terminal devices located in the coverage range of the beam will receive shared PRACH configuration information sent by the network device through multicast signaling. Among them, the multicast signaling includes at least one of the following signaling: multicast signaling carried on a physical downlink shared channel (PDSCH), or common downlink control information (DCI) multicast signaling carried on a physical downlink control channel (PDCCH).

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, for a specified beam, the PRACH format and the time advance for the PRACH sending time relative to the downlink frame timing of the terminal device may be sent simultaneously by using one piece of multicast signaling; or, the PRACH format and the time advance for the PRACH sending time relative to the downlink frame timing of the terminal device may be sent respectively by using more than one piece of multicast signaling.

By implementing the embodiments of the present disclosure, PRACH configuration information can be sent to a terminal device in a coverage region of a specified beam by using multicast signaling, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH Information in advance. By sending the PRACH information in advance, the cyclic prefix length is reduced, the resource is saved, and the resource overhead is reduced.

Referring to FIG. 8, FIG. 8 is a schematic flowchart of another method for configuring a physical random access channel (PRACH) according to some embodiments of the present disclosure. The method is applied to a network device in the communication system shown in FIG. 1. As shown in FIG. 8, the method may include, but is not limited to, the following step.

In step S801, PRACH configuration information is sent to a terminal device in a coverage region of a specified beam by using dedicated signaling of the terminal device, where the PRACH configuration information includes a PRACH format and a time advance for a PRACH sending time relative to downlink frame timing of the terminal device.

In the embodiment of the present disclosure, for each terminal device in the coverage region of the specified beam, the network device may allocate a radio network temporary identity (RNTI) for the terminal device separately, so that the terminal device can receive the PRACH configuration information sent by the network device through the dedicated signaling of the terminal device, thus the network device needs to respectively send the dedicated signaling of the terminal device for each terminal device in the specified beam. Among them, the dedicated signaling of the terminal device includes at least one of the following signaling: radio resource control (RRC) signaling, media access control control element (MAC CE) signaling, or downlink control information (DCI) signaling.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, for each terminal device in the specified beam, the PRACH format and the time advance for the PRACH sending time relative to the downlink frame timing of the terminal device may be sent simultaneously by using one piece of dedicated signaling of the terminal device; or, the PRACH format and the time advance for the PRACH sending time relative to the downlink frame timing of the terminal device may be sent respectively by using more than one piece of dedicated signaling of the terminal device.

By implementing the embodiments of the present disclosure, PRACH configuration information can be sent to a terminal device in a coverage region of a specified beam by using dedicated signaling of the terminal device, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH information in advance. By sending the PRACH information in advance, the cyclic prefix length is reduced, the resource is saved, and the resource overhead is reduced.

Referring to FIG. 9, FIG. 9 is a schematic flowchart of another method for configuring a physical random access channel (PRACH) according to some embodiments of the present disclosure. The method is applied to a network device in the communication system shown in FIG. 1. As shown in FIG. 9, the method may include, but is not limited to, the following step.

In step S901, PRACH configuration information is sent to a terminal device in a positioning region of a specified terminal device by using broadcast signaling, where the PRACH configuration information includes a PRACH format and a time advance for a PRACH sending time relative to downlink frame timing of the terminal device.

In the embodiment of the present disclosure, the network device may allocate a radio network temporary identity (RNTI) for the specified terminal device separately, so that the terminal device will receive the PRACH configuration information sent by the network device through broadcast signaling. The broadcast signaling includes at least one of the following signaling: master information block (MIB) broadcast signaling, or system information block (SIB) broadcast signaling.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACHI sending time; and the sequence length is the length of the random access preamble. In addition, it should be noted that the PRACH format may further include other format parameters, which are not limited here, and may be set according to actual needs.

In the embodiment of the present disclosure, the PRACH format and the time advance for the PRACH sending time relative to the downlink frame timing of the terminal device may be sent simultaneously by using one piece of broadcast signaling; or, the PRACH format and the time advance for the PRACH sending time relative to the downlink frame timing of the terminal device may be sent respectively by using more than one piece of broadcast signaling.

By implementing the embodiments of the present disclosure, PRACH configuration information can be sent to a terminal device in a positioning region of a specified terminal device by using broadcast signaling, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH information in advance. By sending the PRACH information in advance, the cyclic prefix length is reduced, the resource is saved, and the resource overhead is reduced.

Figures 10, 11:
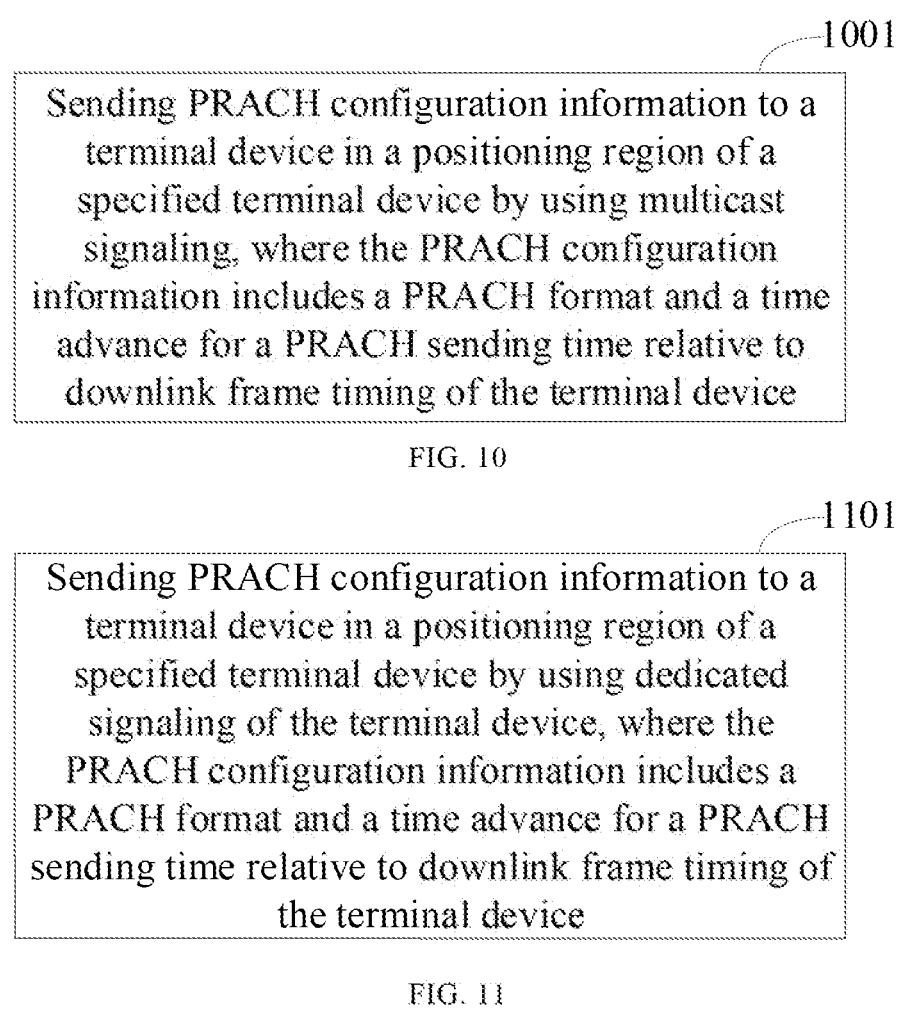

Referring to FIG. 10, FIG. 10 is a schematic flowchart of another method for configuring a physical random access channel (PRACH) according to some embodiments of the present disclosure. The method is applied to a network device in the communication system shown in FIG. 1. As shown in FIG. 10, the method may include, but is not limited to, the following step.

In step S1001, PRACH configuration information is sent to a terminal device in a positioning region of a specified terminal device by using multicast signaling, where the PRACH configuration information includes a PRACH format and a time advance for a PRACH sending time relative to downlink frame timing of the terminal device.

In the embodiment of the present disclosure, the network device may allocate a radio network temporary identity (RNTI) for the specified terminal device separately, so that the terminal device will receive the PRACH configuration information sent by the network device through multicast signaling. Among them, the multicast signaling includes at least one of the following signaling: multicast signaling carried on a physical downlink shared channel (PDSCH), or common downlink control information (DCI) multicast signaling carried on a physical downlink control channel (PDCCH).

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, the PRACH format and the time advance for the PRACH sending time relative to the downlink frame timing of the terminal device may be sent simultaneously by using one piece of multicast signaling; or, the PRACH format and the time advance for the PRACH sending time relative to the downlink frame timing of the terminal device may be sent respectively by using more than one piece of multicast signaling.

By implementing the embodiments of the present disclosure, PRACH configuration information can be sent to a terminal device in a positioning region of a specified terminal device by using multicast signaling, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH information in advance. By sending the PRACH information in advance, the cyclic prefix length is reduced, the resource is saved, and the resource overhead is reduced.

Referring to FIG. 11, FIG. 11 is a schematic flowchart of another method for configuring a physical random access channel (PRACH) according to some embodiments of the present disclosure. The method is applied to a network device in the communication system shown in FIG. 1. As shown in FIG. 11, the method may include, but is not limited to, the following step.

In step S1101, PRACH configuration information is sent to a terminal device in a positioning region of a specified terminal device by using dedicated signaling of the terminal device, where the PRACH configuration information includes a PRACH format and a time advance for a PRACH sending time relative to downlink frame timing of the terminal device.

In the embodiment of the present disclosure, the network device may allocate a radio network temporary identity (RNTI) for the specified terminal device separately, so that the terminal device will receive the PRACH configuration information sent by the network device through the dedicated signaling of the terminal device. The dedicated signaling of the terminal device includes at least one of the following signaling: radio resource control (RRC) signaling, media access control control element (MAC CE) signaling, or downlink control information (DCI) signaling.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, the PRACH format and the time advance for the PRACH sending time relative to the downlink frame timing of the terminal device may be sent simultaneously by using one piece of dedicated signaling of the terminal device; or, the PRACH format and the time advance for the PRACH sending time relative to the downlink frame timing of the terminal device may be sent respectively by using more than one piece of dedicated signaling of the terminal device.

By implementing the embodiments of the present disclosure, PRACH configuration Information can be sent to a terminal device in a positioning region of a specified terminal device by using dedicated signaling of the terminal device, where the PRACH configuration information includes a PRACH format and a time advance for a PRACH sending time relative to downlink frame timing of the terminal device. By configuring a time advance for a PRACH sending time relative to downlink frame timing of the terminal device, the terminal device may send the PRACH information in advance. By sending the PRACH information in advance, the cyclic prefix length is reduced, the resource is saved, and the resource overhead is reduced.

Referring to FIG. 12, FIG. 12 is a schematic flowchart of another method for configuring a physical random access channel (PRACH) according to some embodiments of the present disclosure. The method is applied to a network device in the communication system shown in FIG. 1. As shown in FIG. 12, the method may include, but is not limited to, the following steps.

In step S1201, a time advance for a PRACH sending time and a PRACH format is determined according to related information of a satellite and a specified region.

In the embodiment of the present disclosure, the specified region may include any one of the following regions: a region of a specified cell, a coverage region of a specified beam, and a positioning region of a specified terminal device. Among them, the specified region may be specified by the network device. For example, the network device may specify it randomly, or may specify it according to the sparse degree of the terminal devices in each cell, the difference between the round trip delays (RTD) of the terminal devices, and the like. For example, when the terminal devices in the cell are sparse and the difference between the RTDs of the terminal devices is not significant, the specified region may be the region of the cell; when the terminal devices in the cell are dense or the difference between the RTDs of the terminal devices is significant, the specified region may be the coverage region of each beam or the positioning region of the specified terminal device. Therefore, corresponding PRACH configuration information can be sent to regions of different levels according to needs, thereby reducing resource overhead.

Amon them, when the specified region is the region of the specified cell, all the terminal devices located in the region of the specified cell will receive shared PRACH configuration information; when the specified region is the coverage region of the specified beam, all the terminal devices located in the coverage region will receive shared PRACH configuration information; and when the specified region is the positioning region of the specified terminal device, the specified terminal device located in the positioning region will receive the PRACH configuration information.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, the related information of the satellite may include at least one of the following information: ephemeris information of the satellite, height information of the satellite, or the like. The ephemeris information of the satellite may include satellite orbit and location information of each point on the satellite orbit.

As an example, the related information of the satellite may include height information of the satellite. The network device estimates a round trip delay between the terminal device in the specified region and the network device when the satellite is used as a relay according to the height information of the satellite, and then determines a time advance for a PRACH sending time. The network device may select a PRACH format from a plurality of preset PRACH formats in combination with the time advance for the PRACH sending time and the specified region.

As another example, the related information of the satellite may include ephemeris information of the satellite. The network device may determine height information of the satellite at each point of the satellite orbit according to the ephemeris information, and then estimate a round trip delay between the terminal device in the specified region and the network device when the satellite is used as a relay according to the height information, so as to determine a time advance for a PRACH sending time. The network device may select a PRACH format from a plurality of preset PRACH formats in combination with the time advance for the PRACH sending time and the specified region.

In step S1202, PRACH configuration information is sent to a terminal device in the specified region, where the PRACH configuration information includes the PRACH format and the time advance for the PRACH sending time relative to downlink frame timing of the terminal device.

In the embodiment of the present disclosure, the PRACH format and the time advance for the PRACH sending time relative to the downlink frame timing of the terminal device may be sent simultaneously by using one piece of signaling; or, the PRACH format and the time advance for the PRACH sending time relative to the downlink frame timing of the terminal device may be sent respectively by using more than one piece of signaling.

In the embodiment of the present disclosure, the manner for the network device to send the PRACH configuration information to the terminal device in the specified region may include a variety of manners: broadcast signaling, multicast signaling, dedicated signaling of the terminal device, and the like. In order to improve the configuration efficiency, different manners of sending PRACH configuration information may be adopted for different specified regions.

As an example, the process of performing step 1202 by the network device may be sending the PRACH configuration information by using broadcast signaling in response to the specified region being a region of a specified cell. Among them, the broadcast signaling includes at least one of the following signaling: master information block (MIB) broadcast signaling, or system information block (SIB) broadcast signaling.

As another example, the process of performing step 1202 by the network device may be sending the PRACH configuration information by using multicast signaling in response to the specified region being a coverage region of a specified beam. Among them, the multicast signaling includes at least one of the following signaling: multicast signaling carried on a physical downlink shared channel (PDSCH), or common downlink Control Information (DCI) multicast signaling carried on a physical downlink control channel (PDCCH).

As still another example, the process of performing step 1202 by the network device may be sending the PRACH configuration information by using dedicated signaling of the terminal device in response to the specified region being a positioning region of the specified terminal device. Among them, the dedicated signaling of the terminal device includes at least one of the following signaling: radio resource control (RRC) signaling, media access control control element (MAC CE) signaling, or downlink control information (DCI) signaling.

By implementing the embodiments of the present disclosure, a time advance for a PRACH sending time and a PRACH format may be determined according to related information of a satellite and a specified region, so as to send PRACH configuration information to a terminal device in the specified region, where the PRACH configuration information includes the PRACH format and the time advance for the PRACH sending time relative to downlink frame timing of the terminal device. By configuring the time advance for the PRACH sending time relative to the downlink frame timing of the terminal device, the terminal device may send PRACH information in advance. By sending the PRACH Information in advance, the cyclic prefix length is reduced, the resource is saved and the resource overhead is reduced.

Referring to FIG. 13, FIG. 13 is a schematic flowchart of another method for configuring a physical random access channel (PRACH) according to some embodiments of the present disclosure. The method is applied to a terminal device located in a specified region in the communication system shown in FIG. 1. As shown in FIG. 13, the method may include, but is not limited to, the following step.

In step S1301, PRACH configuration information in a specified region sent by a network device is received, where the PRACH configuration information includes a PRACH format and a time advance for a PRACH sending time relative to downlink frame timing of the terminal device.

In the embodiment of the present disclosure, the specified region may include any one of the following regions: a region of a specified cell, a coverage region of a specified beam, and a positioning region of a specified terminal device. Among them, the specified region may be specified by a network device. For example, the network device may specify it randomly, or may specify it according to the sparse degree of the terminal devices in each cell, the difference between the round trip delays (RTD) of the terminal devices, and the like. For example, when the terminal devices in the cell are sparse and the difference between the RTDs of the terminal devices is not significant, the specified region may be the region of the cell; when the terminal devices in the cell are dense or the difference between the RTDs of the terminal devices is significant, the specified region may be the coverage region of each beam or the positioning region of the specified terminal device. Therefore, corresponding PRACH configuration information can be sent to regions of different levels according to needs, thereby reducing resource overhead.

Amon them, when the specified region is the region of the specified cell, all the terminal devices located in the region of the specified cell will receive shared PRACH configuration information; when the specified region is the coverage region of the specified beam, all the terminal devices located in the coverage region will receive shared PRACH configuration information; and when the specified region is the positioning region of the specified terminal device, the specified terminal device located in the positioning region will receive the PRACH configuration information.

In the embodiment of the present disclosure, the PRACH format may include at least one of the following parameters: a subcarrier spacing, a cycle prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, the manner for the terminal device to receive the PRACH configuration information sent by the network device may include a variety of manners: broadcast signaling, multicast signaling, dedicated signaling of the terminal device, and the like.

In the embodiment of the present disclosure, the process of performing step 1301 by the terminal device may be, for example: receiving the PRACH configuration information sent by the network device through broadcast signaling: or receiving the PRACH configuration information sent by the network device through multicast signaling; or receiving the PRACH configuration information sent by the network device through dedicated signaling of the terminal device.

In some embodiments of the present disclosure, the PRACH configuration information sent through the broadcast signaling may be PRACH configuration information configured by the network device for a region of a specified cell where the terminal device is located. Among them, the broadcast signaling includes at least one of the following signaling; master information block (MIB) broadcast signaling, or system information block (SIB) broadcast signaling.

In some embodiments of the present disclosure, the PRACH configuration information sent through the multicast signaling may be PRACH configuration information configured by the network device for a coverage region of a specified beam where the terminal device is located. Among them, the multicast signaling includes at least one of the following signaling: multicast signaling carried on a physical downlink shared channel (PDSCH), or common downlink control information (DCI) multicast signaling carried on a physical downlink control channel (PDCCH).

In some embodiments of the present disclosure, the PRACH configuration information sent through the dedicated signaling of the terminal device may be PRACH configuration information configured by the network device for the positioning region of the terminal device. Among them, the dedicated signaling of the terminal device includes at least one of the following signaling: radio resource control (RRC) signaling, media access control control element (MAC CE) signaling, or downlink control information (DCI) signaling.

By implementing the embodiments of the present disclosure, a terminal device in a specified region may receive PRACH configuration information in the specified region sent by a network device, where the PRACH configuration information includes a PRACH format and a time advance for a PRACH sending time relative to downlink frame timing of the terminal device, so that the terminal device may send the PRACH information in advance according to the time advance for the PRACH sending time. By sending the PRACH information in advance, the cyclic prefix length is reduced, the resource is saved, and the resource overhead is reduced.

Referring to FIG. 14, FIG. 14 is a schematic flowchart of another method for configuring a physical random access channel (PRACH) according to some embodiments of the present disclosure. The method is applied to a terminal device located in a specified region in the communication system shown in FIG. 1. As shown in FIG. 14, the method may include, but is not limited to, the following steps.

In step S1401, PRACH configuration information in a specified region sent by a network device is received, where the PRACH configuration information includes a PRACH format and a time advance for a PRACH sending time relative to downlink frame timing of the terminal device.

In the embodiment of the present disclosure, the specified region may include any one of the following regions: a region of a specified cell, a coverage region of a specified beam, and a positioning region of a specified terminal device. Among them, the specified region may be specified by a network device. For example, the network device may specify it randomly, or may specify it according to the sparse degree of the terminal devices in each cell, the difference between the round trip delays (RTD) of the terminal devices, and the like. For example, when the terminal devices in the cell are sparse and the difference between the RTDs of the terminal devices is not significant, the specified region may be the region of the cell; when the terminal devices in the cell are dense or the difference between the RTDs of the terminal devices is significant, the specified region may be the coverage region of each beam or the positioning region of the specified terminal device. Therefore, corresponding PRACH configuration information can be sent to regions of different levels according to needs, thereby reducing resource overhead.

Amon them, when the specified region is the region of the specified cell, all the terminal devices located in the region of the specified cell will receive shared PRACH configuration information; when the specified region is the coverage region of the specified beam, all the terminal devices located in the coverage region will receive shared PRACH configuration information; and when the specified region is the positioning region of the specified terminal device, the specified terminal device located in the positioning region will receive the PRACH configuration information.

In the embodiment of the present disclosure, the PRACH format may include at least one of the following parameters: a subcarrier spacing, a cyclic prefix (CP) length, or a sequence length. Among them, the subcarrier spacing corresponds to the bandwidth of one subcarrier; the cyclic prefix (CP) length corresponds to the upper limit of the difference between the round trip delay and the time advance for the PRACH sending time; and the sequence length is the length of the random access preamble. In addition, it should be noted that the PRACH format may further include other format parameters, which are not limited here, and may be set according to actual needs.

In the embodiment of the present disclosure, the manner for the terminal device to receive the PRACH configuration information in the specified region sent by the network device may include a variety of manners: broadcast signaling, multicast signaling, dedicated signaling of the terminal device, and the like.

In the embodiment of the present disclosure, the process of performing step 1401 by the terminal device may be, for example: receiving the PRACH configuration information sent by the network device through broadcast signaling; or receiving the PRACH configuration information sent by the network device through multicast signaling; or receiving the PRACH configuration information sent by the network device through dedicated signaling of the terminal device.

In some embodiments of the present disclosure, the PRACH configuration information sent through the broadcast signaling may be PRACH configuration information configured by the network device for a region of a specified cell where the terminal device is located. Among them, the broadcast signaling includes at least one of the following signaling: master information block (MIB) broadcast signaling, or system information block (SIB) broadcast signaling.

In some embodiments of the present disclosure, the PRACH configuration information sent through the multicast signaling may be PRACH configuration information configured by the network device for a coverage region of a specified beam where the terminal device is located. Among them, the multicast signaling includes at least one of the following signaling: multicast signaling carried on a physical downlink shared channel (PDSCH), or common downlink Control Information (DCI) multicast signaling carried on a physical downlink control channel (PDCCH).

In some embodiments of the present disclosure, the PRACH configuration information sent through the dedicated signaling of the terminal device may be PRACH configuration information configured by the network device for a positioning region of the terminal device. Among them, the dedicated signaling of the terminal device includes at least one of the following signaling: radio resource control (RRC) signaling, media access control control element (MAC CE) signaling, or downlink control information (DCI) signaling.

In step S1402, a PRACH sending time point is determined according to the time advance for the PRACH sending time and the downlink frame timing of the terminal device.

In the embodiment of the present disclosure, there may be a plurality of downlink frames of the terminal device, and the terminal device may select timing of a latest downlink frame from them. The terminal device may determine the PRACH sending time point according to the timing of the downlink frame and the time advance for the PRACH sending time.

In some embodiments of the present disclosure, the PRACH sending time point may be obtained by subtracting the time advance for the PRACH sending time from the time point of the downlink frame timing.

In step S1403, PRACH information is sent at the PRACH sending time point according to the PRACH format.

In the embodiment of the present disclosure, the terminal device may generate PRACH information to be sent according to the PRACH format, and then send the PRACH information at the PRACH sending time point.

In the embodiment of the present disclosure, the time advance for the PRACH sending time and the PRACH format are configured for the terminal device in the specified region, but the round trip delays of the terminal devices at different positions in the specified region may be not consistent. For example, the round trip delay at the center of the specified region may be smaller relative to the round trip delay at the edge of the specified region. Therefore, for a particular terminal device, when the time advance for the PRACH sending time is less than the round trip delay of the terminal device, interference may be avoided relying on the cyclic prefix of the random access preamble. Due to configuration of the time advance for the PRACH sending time, the cyclic prefix length may be greatly reduced, thus reducing resource overhead.

By implementing the embodiments of the present disclosure, PRACH configuration information in a specified region sent by a network device can be received, where the PRACH configuration information includes a PRACH format and a time advance for a PRACH sending time relative to downlink frame timing of the terminal device; a PRACH sending time point is determined according to the time advance for the PRACH sending time and the downlink frame timing of the terminal device; and the PRACH information is sent at the PRACH sending time point according to the PRACH format, thus realizing that the PRACH information is sent in advance, reducing the cyclic prefix length, saving the resource, and reducing the resource overhead.

In the embodiments provided in the present disclosure, the method provided in the embodiments of the present disclosure is introduced from the perspective of the network device and the terminal device, respectively. In order to implement the various functions in the method provided in the embodiments of the present disclosure, the network device and the terminal device may include a hardware structure and a software module to implement the various functions in the form of a hardware structure, a software module, or a hardware structure plus a software module. A certain function of the various functions may be performed in a hardware structure, a software module, or a hardware structure plus a software module.

Figure 15:
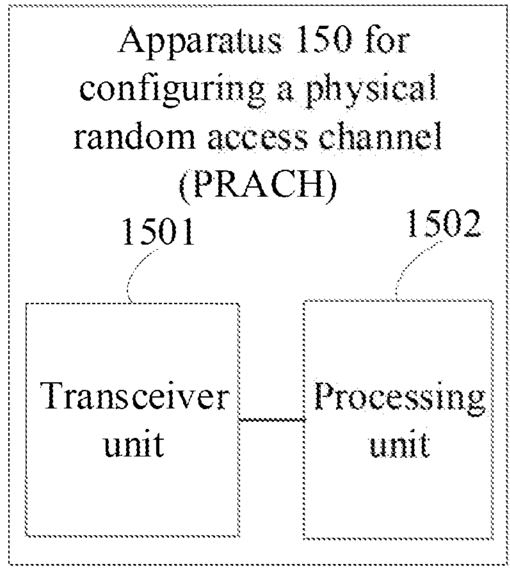
FIG. 15 is a schematic structural diagram of an apparatus for configuring a physical random access channel (PRACH) according to some embodiments of the present disclosure.

Referring to FIG. 15, FIG. 15 is a schematic structural diagram of an apparatus 150 for configuring a physical random access channel (PRACH) according to some embodiments of the present disclosure. The apparatus 150 for configuring a physical random access channel (PRACH) shown in FIG. 15 may include a transceiving unit 1501 and a processing unit 1502. The transceiving unit 1501 may include a sending unit and/or a receiving unit, the sending unit is configured to implement a sending function, the receiving unit is configured to implement a receiving function, and the transceiving unit 1501 may implement a sending function and/or a receiving function.

The apparatus 150 for configuring a physical random access channel (PRACH) may be a network device, or may be an apparatus in a network device, or may be an apparatus that can be used and matched with a network device. Alternatively, the apparatus 150 for configuring a physical random access channel (PRACH) may be a terminal device, or may be an apparatus in the terminal device, or may be an apparatus that can be used and matched with a terminal device.

The apparatus 150 for configuring a physical random access channel (PRACH) is a network device. The transceiving unit 1501 is configured to send PRACH configuration information to a terminal device in a specified region, where the PRACH configuration Information includes a PRACH format and a time advance for a PRACH sending time relative to downlink frame timing of the terminal device.

In some embodiments, the specified region includes any one of the following regions; a region of a specified cell, a coverage region of a specified beam, and a positioning region of a specified terminal device.

In some embodiments, the PRACH format includes at least one of the following parameters: a subcarrier spacing, a cyclic prefix (CP) length, or a sequence length.

In some embodiments, the transceiving unit 1501 is specifically configured to:

send the PRACH configuration information by using broadcast signaling in response to the specified region being a region of a specified cell; or send the PRACH configuration information by using multicast signaling in response to the specified region being a coverage region of a specified beam; or sending the PRACH configuration information by using dedicated signaling of the terminal device in response to the specified region being a positioning region of a specified terminal device.

In some embodiments of the present disclosure, the broadcast signaling includes at least one of the following signaling: a master system information block (MIB) broadcast signaling or system information block (SIB) broadcast signaling;

The multicast signaling includes at least one of the following signaling: multicast signaling carried on a physical downlink shared channel (PDSCH), or common downlink control information (DCI) multicast signaling carried on a physical downlink control channel (PDCCH).

The dedicated signaling of the terminal device includes at least one of the following signaling: radio resource control (RRC) signaling, media access control control element (MAC CE) signaling, or downlink control information (DCI) signaling.

In some embodiments of the present disclosure, the processing unit 1502 is configured to determine the time advance for the PRACH sending time and the PRACH format according to related information of a satellite and the specified region.

Among them, the related information of the satellite includes at least one of the following information: ephemeris information of the satellite, or height information of the satellite.

In some embodiments, the processing unit 1502 is specifically configured to: in response to the specified region being a region of a specified cell, determine the time advance for the PRACH sending time and the PRACH format according to the related information of the satellite and the region of the specified cell; or in response to the specified region being a coverage region of a specified beam, determine the time advance for the PRACH sending time and the PRACH format according to the related information of the satellite and the coverage region; or in response to the specified region being a positioning region of a specified terminal device, determine the time advance for the PRACH sending time and the PRACH format according to the related information of the satellite and the positioning region.

The apparatus 150 for configuring a physical random access channel (PRACH) is a terminal device. The transceiving unit 1501 is configured to receive PRACH configuration information in the specified region sent by a network device, where the PRACH configuration information includes a PRACH format and a time advance for a PRACH sending time relative to downlink frame timing of the terminal device.

In some embodiments, the specified region includes any one of the following regions: a region of a specified cell, a coverage region of a specified beam, and a positioning region of a specified terminal device.

In some embodiments, the PRACH format includes at least one of the following parameters: a subcarrier spacing, a cyclic prefix (CP) length, or a sequence length.

In some embodiments, the transceiving unit 1501 is specifically configured to: receive the PRACH configuration information sent by the network device through broadcast signaling; or receive the PRACH configuration information sent by the network device through multicast signaling; or receive the PRACH configuration information sent by the network device through dedicated signaling of the terminal device.

In some embodiments of the present disclosure, the broadcast signaling includes at least one of the following signaling: master system information block (MIB) broadcast signaling, or system information block (SIB) broadcast signaling;

The multicast signaling includes at least one of the following signaling; multicast signaling carried on a physical downlink shared channel (PDSCH), or common downlink control information (DCI) multicast signaling carried on a physical downlink control channel (PDCCH).

The dedicated signaling of the terminal device includes at least one of the following signaling: radio resource control (RRC) signaling, media access control control element (MAC CE) signaling, or downlink control information (DCI) signaling.

In some embodiments of the present disclosure, the processing unit 1502 is configured to determine a PRACH sending time point according to the time advance for the PRACH sending time and the downlink frame timing of the terminal device; and the transceiving unit 1501 is further configured to send PRACH information at the PRACH sending time point according to the PRACH format.

Figure 16:
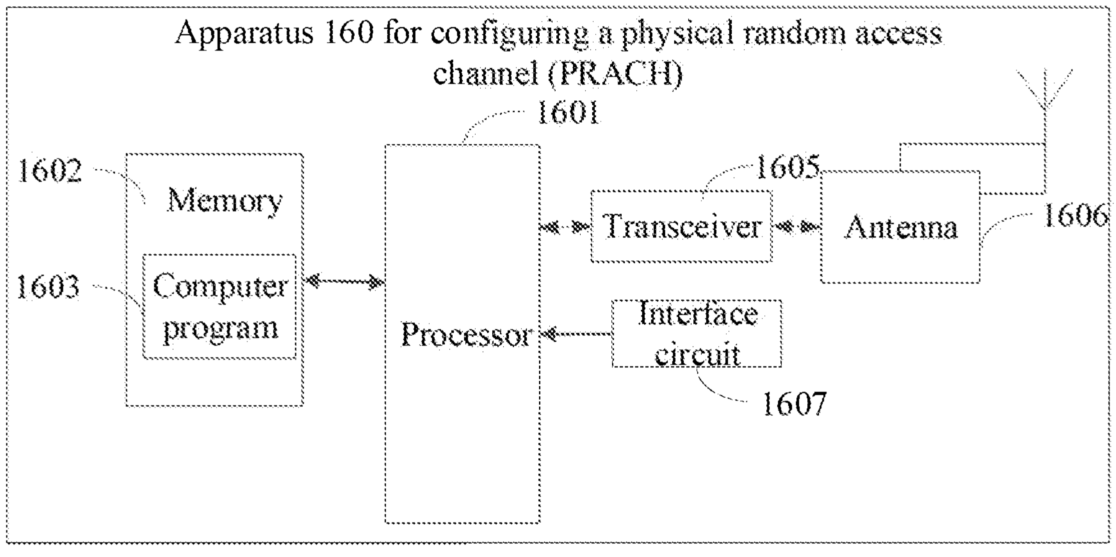
FIG. 16 is a schematic structural diagram of another apparatus for configuring a physical random access channel (PRACH) according to some embodiments of the present disclosure.

Referring to FIG. 16, FIG. 16 is a schematic structural diagram of another apparatus 160 for configuring a physical random access channel (PRACH) according to some embodiments of the present disclosure. The apparatus 160 for configuring a physical random access channel (PRACH) may be a network device, or may be a terminal device, or may be a chip, a chip system, or a processor that supports a network device to implement the above method, or may be a chip, a chip system, or a processor that supports a terminal device to implement the above method. The apparatus may be configured to implement the method described in the above method embodiments, and details may be referred to the description in the above method embodiments.

The apparatus 160 for configuring a physical random access channel (PRACH) may include one or more processors 1601. The processor 1601 may be a general-purpose processor or a dedicated processor or the like. For example, it may be a baseband processor or a central processing unit. The baseband processor may be configured to process a communication protocol and communication data, and the central processing unit may be configured to control the apparatus for configuring a physical random access channel (PRACH) (for example, a base station, a baseband chip, a terminal device, a terminal device chip, a DU or a CU, etc.), execute a computer program, and process data of the computer program.

In some embodiments of the present disclosure, the apparatus 160 for configuring a physical random access channel (PRACH) may further include one or more memories 1602 on which a computer program 1603 may be stored. The processor 1601 executes the computer program 1603, so that the apparatus 160 for configuring a physical random access channel (PRACH) performs the method described in the above method embodiments. The computer program 1603 may be embedded in the processor 1601, and in this case, the processor 1601 may be implemented by hardware.

In some embodiments of the present disclosure, the memory 1602 may further store with data. The apparatus 160 for configuring a physical random access channel (PRACH) and the memory 1602 may be separately configured or integrated together.

In some embodiments of the present disclosure, the apparatus 160 for configuring a physical random access channel (PRACH) may further include a transceiver 1605, and an antenna 1606. The transceiver 1605 may be referred to as a transceiving unit, a transceiving machine, or a transceiving circuit and the like, for implementing a transceiving function. The transceiver 1605 may include a receiver and a transmitter, and the receiver may be referred to as a receiving machine or a receiving circuit, for implementing a receiving function; and the transmitter may be referred to as a sending machine or a sending circuit, for implementing a sending function.

In some embodiments of the present disclosure, the apparatus 160 for configuring a physical random access channel (PRACH) may further include one or more interface circuits 1607 configured to receive the code instruction and transmit the code instruction to the processor 1601. The processor 1601 runs the code instruction to enable the apparatus 160 for configuring a physical random access channel (PRACH) to perform the method described in the above method embodiments.

The apparatus 160 for configuring a physical random access channel (PRACH) is a network device. The transceiver 1605 is configured to perform step S201 in FIG. 2, step S301 in FIG. 3, step S401 in FIG. 4, step S501 in FIG. 5, step S601 in FIG. 6, step S701 in FIG. 7, step S801 in FIG. 8, step S901 in FIG. 9, step S1001 in FIG. 10, step S1101 in FIG. 11, and step S1202 in FIG. 12. The processor 1601 is configured to perform step S1201 in FIG. 12.

The apparatus 160 for configuring a physical random access channel (PRACH) is a terminal device. The transceiver 1605 is configured to perform step S1301 in FIG. 13, step S1401 and step S1403 in FIG. 14, The processor 1601 is configured to perform step S1402 in FIG. 14.

In an implementation, the processor 1601 may include a transceiver for implementing a receiving and sending function. For example, the transceiver may be a transceiving circuit, an interface, or an interface circuit. The transceiving circuit, the interface, or the interface circuit for implementing the receiving and sending function may be separate or integrated together. The transceiving circuit, the interface, or the interface circuit may be configured to read and write code/data; or, the transceiving circuit, the interface, or the interface circuit may be configured for signal transmission or delivery.

In an implementation, the apparatus 160 for configuring a physical random access channel (PRACH) may include a circuit, and the circuit may implement a function of sending or receiving or communicating in the above method embodiments. The processor and the transceiver described in the present disclosure may be implemented on an integrated circuit (IC), an analog IC, a radio frequency integrated circuit (RFIC), a mixed signal IC, an application specific integrated circuit (ASIC), a printed circuit board (PCB), and an electronic device, etc. The processor and the transceiver may also be manufactured by using various IC process technologies, such as complementary metal oxide semiconductor (CMOS), nMetal-oxide semiconductor (NMOS), positive channel metal oxide semiconductor (PMOS), bipolar junction transistor (BJT), bipolar CMOS (BICMOS), silicon germanium (SiGe), and gallium arsenide (GaAs), etc.

The apparatus for configuring a physical random access channel (PRACH) described in the above embodiments may be a network device or a terminal device. However, the range of the apparatus for configuring a physical random access channel (PRACH) described in the present disclosure is not limited to this, and the structure of the apparatus for configuring a physical random access channel (PRACH) may not be limited by FIG. 16. The apparatus for configuring a physical random access channel (PRACH) may be an independent device or may be part of a larger device. For example, the apparatus for configuring a physical random access channel (PRACH) may be:

(1) an independent integrated circuit (IC), or a chip, or a chip system or subsystem;
(2) a set having one or more ICs, where, the IC set may also include a storage component for storing data and a computer program;
(3) an ASIC, such as a modem;
(4) a module that may be embedded in other devices;
(5) a receiver, a terminal device, an intelligent terminal device, a cellular phone, a wireless device, a handset, a mobile unit, a vehicle-mounted device, a network device, a cloud device, an artificial intelligence device, etc.
(6) other devices and the like.

Figure 17:
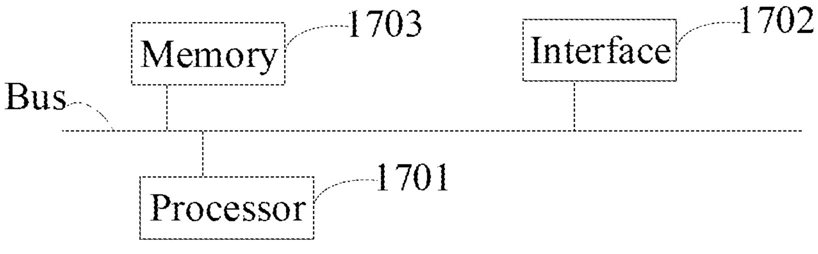
FIG. 17 is a schematic structural diagram of a chip according to some embodiments of the present disclosure.

For the case that the apparatus for configuring a physical random access channel (PRACH) may be a chip or a chip system, reference can be made to the schematic structural diagram of a chip shown in FIG. 17. The chip shown in FIG. 17 includes a processor 1701 and an interface 1702, where the number of the processor 1701 may be one or more, and the number of the interface 1702 may be more than one.

For the case that the chip is configured to implement the functions of the network device in the embodiment of the present disclosure the interface 1702 is configured to receive a code instruction and to transmit the code instruction to the processor, the processor 1701 is configured to run the code instruction to execute the method as described in FIG. 2 to FIG. 12.

For the case that the chip is configured to implement the functions of the terminal device in the embodiment of the present disclosure the interface 1702 is configured to receive a code instruction and to transmit the code instruction to the processor, the processor 1701 is configured to run the code instruction to execute the method as described in FIG. 13 or FIG. 14.

In some embodiments of the present disclosure, the chip further includes a memory 1703, and the memory 1703 is configured to store necessary computer programs and data.

Those skilled in the art may also understand that the various illustrative logical blocks and steps listed in the embodiments of the present disclosure may be implemented by electronic hardware, computer software, or a combination of them. Whether such a function is implemented by hardware or software depends on the particular application and the design requirements of the entire system. Those skilled in the art may implement the functions by using various methods for each specific application, but it should not be understood that the implementation goes beyond the scope of protection of the embodiments of the present disclosure.

There is further provided a communication system according to the embodiments of the present disclosure. The system includes an apparatus for configuring a physical random access channel (PRACH) serving as a terminal device and an apparatus for configuring a physical random access channel (PRACH) serving as a network device in the above embodiment of FIG. 15. Alternatively, the system includes an apparatus for configuring a physical random access channel (PRACH) serving as a terminal device and an apparatus for configuring a physical random access channel (PRACH) serving as a network device in the above embodiment of FIG. 16.

The present disclosure further provides a readable storage medium on which an instruction is stored. When the instruction is executed by a computer, the functions of any of the above method embodiments are implemented.

The present disclosure further provides a computer program product. When the computer program product is executed by a computer, the functions of any one of the above method embodiments are implemented.

Embodiments of the present disclosure provide a method and an apparatus for configuring a physical random access channel (PRACH), which can be applied to a scenario in which communication between a terminal device and a network device is implemented by using a satellite as a node in a satellite communication technology, and can also be applied to a scenario of communication between a terminal device and a network device in a cellular mobile communication technology, By configuring a time advance for a PRACH sending time relative to downlink frame timing of a terminal device, the terminal device may send PRACH information in advance. By sending the PRACH information in advance, the cyclic prefix length is reduced, the resource is saved, and the resource overhead is reduced.

According to a first aspect, there is provided a method for configuring a physical random access channel (PRACH) according to some embodiments of the present disclosure, which is applied to a network device. The method includes:

sending PRACH configuration information to a terminal device in a specified region, where the PRACH configuration information includes a PRACH format and a time advance for a PRACH sending time relative to downlink frame timing of the terminal device.

In this technical solution, by configuring a time advance for a PRACH sending time relative to downlink frame timing of a terminal device, the terminal device may send PRACH information in advance. By sending the PRACH information in advance, the cyclic prefix length is reduced, the resource is saved, and the resource overhead is reduced.

In some embodiments, the specified region includes any one of following regions: a region of a specified cell, a coverage region of a specified beam, or a positioning region of a specified terminal device.

In this technical solution, the specified region can be regions with different levels, so that corresponding PRACH configuration information can be sent to the regions with different levels according to needs, further reducing the resource overhead.

In some embodiments, the PRACH format includes at least one of following parameters: a subcarrier spacing, a cyclic prefix (CP) length, or a sequence length.

In some embodiments, sending PRACH configuration information to a terminal device in a specified region includes:

sending the PRACH configuration information by using broadcast signaling in response to the specified region being a region of a specified cell; or, sending the PRACH configuration information by using multicast signaling in response to the specified region being a coverage region of a specified beam; or, sending the PRACH configuration information by using dedicated signaling of the terminal device in response to the specified region being a positioning region of a specified terminal device.

In some embodiments of the present disclosure, the broadcast signaling includes at least one of following signaling: master system information block (MIB) broadcast signaling or system information block (SIB) broadcast signaling;

the multicast signaling includes at least one of following signaling: multicast signaling carried on a physical downlink shared channel (PDSCH) or common downlink control information (DCI) multicast signaling carried on a physical downlink control channel (PDCCH);

the dedicated signaling of the terminal device includes at least one of following signaling: radio resource control (RRC) signaling, media access control control element (MAC CE) signaling, or downlink control information (DCI) signaling.

In this technical solution, different manners of sending PRACH configuration information can be used for specified regions with different levels, thus improving the configuration efficiency.

In some embodiments, the method further includes: determining the time advance for the PRACH sending time and the PRACH format according to related information of a satellite and the specified region;

where the related information of the satellite includes at least one of following information; ephemeris information of the satellite or height information of the satellite.

In some embodiments, determining the time advance for the PRACH sending time and the PRACH format according to related information of a satellite and the specified region includes:

determining, in response to the specified region being a region of a specified cell, the time advance for the PRACH sending time and the PRACH format according to the related information of the satellite and the region of the specified cell; or determining, in response to the specified region being a coverage region of a specified beam, the time advance for the PRACH sending time and the PRACH format according to the related information of the satellite and the coverage region; or determining, in response to the specified region being a positioning region of a specified terminal device, the time advance for the PRACH sending time and the PRACH format according to the related information of the satellite and the positioning region.

In this technical solution, the time advance for the PRACH sending time and the PRACH format in the specified region are determined in combination with at least one of ephemeris information of a satellite or height information of a satellite, as well as the specified region. It can improve the accuracy of determining the PRACH configuration information, and is suitable for a terminal device with poor positioning capability, having good applicability.

According to a second aspect, there is provided another method for configuring a physical random access channel (PRACH) according to some embodiments of the present disclosure, which is applied to a terminal device in a specified region. The method includes:

receiving PRACH configuration information in the specified region sent by a network device, where the PRACH configuration information includes a PRACH format and a time advance for a PRACH sending time relative to downlink frame timing of the terminal device.

In this technical solution, according to a time advance for a PRACH sending time relative to downlink frame timing of a terminal device, the terminal device may send PRACH information in advance. By sending the PRACH information in advance, the cyclic prefix length is reduced, the resource is saved, and the resource overhead is reduced.

In some embodiments, the specified region includes any one of following regions: a region of a specified cell, a coverage region of a specified beam, or a positioning region of a specified terminal device.

In this technical solution, the specified region can be regions with different levels, so that corresponding PRACH configuration information can be sent to the regions with different levels according to needs, further reducing the resource overhead.

In some embodiments, the PRACH format includes at least one of following parameters: a subcarrier spacing, a cyclic prefix (CP) length, or a sequence length.

In some embodiments, receiving PRACH configuration information in the specified region sent by a network device includes:

receiving the PRACH configuration information sent by the network device through broadcast signaling; or receiving the PRACH configuration information sent by the network device through multicast signaling; or receiving the PRACH configuration information sent by the network device through dedicated signaling of the terminal device.

In some embodiments of the present disclosure, the broadcast signaling includes at least one of following signaling: master system information block (MIB) broadcast signaling or system information block (SIB) broadcast signaling;

the multicast signaling includes at least one of following signaling: multicast signaling carried on a physical downlink shared channel (PDSCH) or common downlink control information (DCI) multicast signaling carried on a physical downlink control channel (PDCCH);

the dedicated signaling of the terminal device includes at least one of following signaling: radio resource control (RRC) signaling, media access control control element (MAC CE) signaling, or downlink control information (DCI) signaling.

In this technical solution, different manners of sending PRACH configuration information can be used for specified regions with different levels, thus improving the configuration efficiency.

In some embodiments, the method further includes: determining a PRACH sending time point according to the time advance for the PRACH sending time and the downlink frame timing of the terminal device; and sending PRACH information at the PRACH sending time point according to the PRACH format.

In this technical solution, the terminal device may determine the PRACH sending time point according to the time advance for the PRACH sending time and the downlink frame timing of the terminal device, so as to implement resource saving.

According to a third aspect, there is provided an apparatus for configuring a physical random access channel (PRACH) according to some embodiments of the present disclosure. The apparatus for configuring a physical random access channel (PRACH) has some or all of the functions of a network device in implementing the method according to the first aspect. For example, the functions of the apparatus for configuring a physical random access channel (PRACH) may include the functions in some or all of the embodiments of the present disclosure, and may also include the functions of separately implementing any one of the embodiments of the present disclosure. The functions may be implemented by hardware, or may be implemented by hardware executing corresponding software. The hardware or software includes one or more units or modules corresponding to the above functions.

The apparatus for configuring a physical random access channel (PRACH) includes: a transceiving unit, configured to send PRACH configuration information to a terminal device in a specified region, wherein the PRACH configuration information comprises a PRACH format and a time advance for a PRACH sending time relative to downlink frame timing of the terminal device.

In some embodiments, the specified region comprises any one of following regions: a region of a specified cell, a coverage region of a specified beam, or a positioning region of a specified terminal device.

In some embodiments, the PRACH format comprises at least one of following parameters: a subcarrier spacing, a cyclic prefix (CP) length, or a sequence length.

In some embodiments, the transceiving unit is configured to:

send the PRACH configuration information by using broadcast signaling in response to the specified region being a region of a specified cell; or send the PRACH configuration information by using multicast signaling in response to the specified region being a coverage region of a specified beam; or send the PRACH configuration information by using dedicated signaling of the terminal device in response to the specified region being a positioning region of a specified terminal device.

In some embodiments, the broadcast signaling comprises at least one of following signaling: master system information block (MIB) broadcast signaling or system information block (SIB) broadcast signaling;

the multicast signaling comprises at least one of following signaling: multicast signaling carried on a physical downlink shared channel (PDSCH) or common downlink control information (DCI) multicast signaling carried on a physical downlink control channel (PDCCH);

the dedicated signaling of the terminal device comprises at least one of following signaling: radio resource control (RRC) signaling, media access control control element (MAC CE) signaling, or downlink control information (DCI) signaling.

In some embodiments, the apparatus further includes:

a processing unit, configured to determine the time advance for the PRACH sending time and the PRACH format according to related information of a satellite and the specified region;

where the related information of the satellite comprises at least one of following information: ephemeris information of the satellite or height information of the satellite.

In some embodiments, the processing unit is configured to:

determine, in response to the specified region being a region of a specified cell, the time advance for the PRACH sending time and the PRACH format according to the related information of the satellite and the region of the specified cell; or determine, in response to the specified region being a coverage region of a specified beam, the time advance for the PRACH sending time and the PRACH format according to the related information of the satellite and the coverage region; or determine, in response to the specified region being a positioning region of a specified terminal device, the time advance for the PRACH sending time and the PRACH format according to the related information of the satellite and the positioning region.

According to a fourth aspect, there is provided another apparatus for configuring a physical random access channel (PRACH) according to some embodiments of the present disclosure. The apparatus for configuring a physical random access channel (PRACH) has some of all of the functions of a terminal device in implementing the method example according to the second aspect. For example, the functions of the apparatus for configuring a physical random access channel (PRACH) may include the functions in some or all of the embodiments of the present disclosure, and may also include the functions of separately implementing any one of the embodiments of the present disclosure. The functions may be implemented by hardware, or may be implemented by hardware executing corresponding software. The hardware or software includes one or more units or modules corresponding to the above functions.

The apparatus for configuring a physical random access channel (PRACH) includes: a transceiving unit, configured to receive PRACH configuration information in the specified region sent by a network device, wherein the PRACH configuration information comprises a PRACH format and a time advance for a PRACH sending time relative to downlink frame timing of the terminal device.

In some embodiments, the specified region comprises any one of following regions: a region of a specified cell, a coverage region of a specified beam, or a positioning region of a specified terminal device.

In some embodiments, the PRACH format comprises at least one of following parameters: a subcarrier spacing, a cyclic prefix (CP) length, or a sequence length.

In some embodiments, the transceiving unit is configured to:

receive the PRACH configuration information sent by the network device through broadcast signaling; or receive the PRACH configuration information sent by the network device through multicast signaling; or receive the PRACH configuration information sent by the network device through dedicated signaling of the terminal device.

In some embodiments, the broadcast signaling comprises at least one of following signaling: master system information block (MIB) broadcast signaling or system information block (SIB) broadcast signaling;

the multicast signaling comprises at least one of following signaling: multicast signaling carried on a physical downlink shared channel (PDSCH) or common downlink control information (DCI) multicast signaling carried on a physical downlink control channel (PDCCH);

the dedicated signaling of the terminal device comprises at least one of following signaling: radio resource control (RRC) signaling, media access control control element (MAC CE) signaling, or downlink control information (DCI) signaling.

In some embodiments, the apparatus further includes a processing unit, where, the processing unit is configured to determine a PRACH sending time point according to the time advance for the PRACH sending time and the downlink frame timing of the terminal device; and the transceiving unit is further configured to send PRACH information at the PRACH sending time point according to the PRACH format.

According to a fifth aspect, there is provided an apparatus for configuring a physical random access channel (PRACH) according to some embodiments of the present disclosure. The apparatus includes a processor, and when the processor invokes a computer program in a memory, the method according to the first aspect is executed.

According to a sixth aspect, there is provided an apparatus for configuring a physical random access channel (PRACH) according to some embodiments of the present disclosure. The apparatus includes a processor, and when the processor invokes a computer program in a memory, the method according to the second aspect is executed.

According to a seventh aspect, there is provided an apparatus for configuring a physical random access channel (PRACH) according to some embodiments of the present disclosure. The apparatus includes a processor and a memory, and the memory stores with a computer program. The processor executes the computer program stored in the memory to enable the apparatus to execute the method according to the first aspect.

According to an eighth aspect, there is provided an apparatus for configuring a physical random access channel (PRACH) according to some embodiments of the present disclosure. The apparatus includes a processor and a memory, and the memory stores with a computer program. The processor executes the computer program stored in the memory to enable the apparatus to execute the method according to the second aspect.

According to a ninth aspect, there is provided an apparatus for configuring a physical random access channel (PRACH) according to some embodiments of the present disclosure. The apparatus includes a processor and an interface circuit. The interface circuit is configured to receive a code instruction and transmit the code instruction to the processor, and the processor is configured to run the code instruction to enable the apparatus to execute the method according to the first aspect.

According to a tenth aspect, there is provided an apparatus for configuring a physical random access channel (PRACH) according to some embodiments of the present disclosure. The apparatus includes a processor and an interface circuit. The interface circuit is configured to receive a code instruction and transmit the code instruction to the processor, and the processor is configured to run the code instruction to enable the apparatus to execute the method according to the second aspect.

According to an eleventh aspect, there is provided a communication system according to some embodiments of the present disclosure. The system includes an apparatus for configuring a physical random access channel (PRACH) according to the third aspect and an apparatus for configuring a physical random access channel (PRACH) according to the fourth aspect; or, the system includes an apparatus for configuring a physical random access channel (PRACH) according to the fifth aspect and an apparatus for configuring a physical random access channel (PRACH) according to the sixth aspect; or, the system includes an apparatus for configuring a physical random access channel (PRACH) according to the seventh aspect and an apparatus for configuring a physical random access channel (PRACH) according to the eighth aspect; or, the system includes an apparatus for configuring a physical random access channel (PRACH) according to the ninth aspect and an apparatus for configuring a physical random access channel (PRACH) according to the tenth aspect.

According to a twelfth aspect, there is provided a non-transitory computer-readable storage medium according to some embodiments of the present disclosure, which is configured to store an instruction used by the network device. When the instruction is executed, the network device is enabled to execute the method according to the first aspect.

According to a thirteenth aspect, there is provided a non-transitory computer-readable storage medium according to some embodiments of the present disclosure, which is configured to store an instruction used by the terminal device. When the instruction is executed, the terminal device is enabled to execute the method according to the second aspect.

According to a fourteenth aspect, there is provided a computer program product including a computer program product, according to the present disclosure. When the computer program product runs on a computer, the computer is enabled to execute the method according to the first aspect.

According to a fifteenth aspect, there is provided a computer program product including a computer program product, according to the present disclosure. When the computer program product runs on a computer, the computer is enabled to execute the method according to the second aspect.

According to a sixteenth aspect, there is provided a chip system according to the present disclosure. The chip system includes at least one processor and an interface, for supporting a network device to implement the functions involved in the first aspect, for example, determining or processing at least one of data or information involved in the above method. In a possible design, the chip system further includes a memory, and the memory is configured to store computer programs and data necessary for the network device. The chip system may be composed of a chip, or may include a chip and other discrete devices.

According to a seventeenth aspect, there is provided a chip system according to the present disclosure. The chip system includes at least one processor and an interface, for supporting a terminal device to implement the functions involved in the second aspect, for example, determining or processing at least one of data or information involved in the above method. In a possible design, the chip system further includes a memory, and the memory is configured to store computer programs and data necessary for the terminal device. The chip system may be composed of a chip, or may include a chip and other discrete devices.

According to an eighteenth aspect, there is provided a computer program according to the present disclosure. When the computer program runs on a computer, the computer is enabled to execute the method according to the first aspect.

According to a nineteenth aspect, there is provided a computer program according to the present disclosure. When the computer program runs on a computer, the computer is enabled to execute the method according to the second aspect.

The above embodiment may be all or partially implemented by software, hardware, firmware, or any combination of them. When implemented by using software, they may be all or partially implemented in the form of a computer program product. The computer program product includes one or more computer programs. When the computer program is loaded and executed on a computer, the processes or functions according to the embodiments of the present disclosure are all or partially generated. The computer may be a general-purpose computer, a special purpose computer, a computer network, or other programmable apparatus. The computer program may be stored in a computer-readable storage medium or transmitted from a computer-readable storage medium to another computer-readable storage medium. For example, the computer program may be transmitted from a website site, computer, server, or data center to another website site, computer, server, or data center through a wired manner (e.g., coaxial cable, optical fiber, digital subscriber line (DSL)) or a wireless manner (e.g., infrared, wireless, microwave, etc.). The computer-readable storage medium may be any usable medium accessible by a computer, or a data storage device such as a server or a data center that integrates one or more usable mediums. The usable medium may be a magnetic medium (e.g., a floppy disk, a hard disk, or a magnetic tape), an optical medium (e.g., a high density digital video disc (DVD)), or a semiconductor medium (e.g., a solid state drive (SSD)), etc.

Those of ordinary skill in the art may understand that "first", "second" and other numerical numbers involved in the present disclosure are used for distinguishing and convenience of the description, are not used to limit the scope of the embodiments of the present disclosure, and also represent the sequence.

"At least one" in the present disclosure may also be described as "one or more", and "more" may be two, three, four or more, which is not limited in the present disclosure. In the embodiments of the present disclosure, for one kind of technical features, the technical features in this kind of technical features are distinguished by "first", "second", "third", "A", "B", "C", "D", etc. There is no sequence or size order among the technical features described in "first", "second", "third", "A", "B", "C" and "D".

The correspondence shown in each table in the present disclosure may be configured, or may be predefined. The value of the information in each table is an example, and may be configured as other values, which is not limited in the present disclosure. When the correspondence between the information and each parameter is configured, there is no need to configure all the correspondences shown in each table. For example, in the table of the present disclosure, the correspondences shown in certain rows may also not be configured. For another example, appropriate deformation adjustment may be performed based on the above table, such as splitting, merging, and the like. The parameter names shown in the title in each table may also use other names that may be understood by the communication apparatus, and the values or representations of the parameter may also be other values or representations that may be understood by the communication apparatus. When the above tables are implemented, other data structures may also be used, for example, an array, a queue, a container, a stack, a linear table, a pointer, a linked list, a tree, a graph, a structure, a class, a heap, a hash list, or a hash table may be used.

The predefinition in the present disclosure may be understood as defining, pre-defining, storing, pre-storing, pre-negotiating, pre-configuring, embodying, or pre-firing.

Those of ordinary skill in the art may be aware that units and algorithm steps of the examples described in connection with the embodiments disclosed here can be implemented by electronic hardware, or a combination of computer software and electronic hardware. Whether the functions are performed by hardware or software depends on specific applications and design constraint conditions of the technical solutions. The professional and skilled person may use different methods to implement the described functions for each specific application, but it should not be considered that the implementation goes beyond the scope of the present disclosure.

It may be clearly understood by those skilled in the art that, for the convenience and brevity of description, with respect the specific working process of the described system, apparatus and unit, reference may be made to the corresponding process in the above method embodiments, and details are not described here again.

The above is specific embodiments of the present disclosure, and the protection scope of the present disclosure is not limited to this. Any skilled person familiar with this technical field could easily conceive of change or replacement within the technical scope disclosed in the present disclosure, which should be covered within the protection scope of the present disclosure, Therefore, the protection scope of the present disclosure shall be based on the protection scope of the claims.

What is claimed is:

1. A method for configuring a physical random access channel (PRACH), performed by a network device, wherein the method comprises:

sending PRACH configuration information to a terminal device in a specified region, wherein the specified region is determined according to a difference between round trip delays (RTD) of terminal devices, the specified region comprises a coverage region of a specified beam or a positioning region of a specified terminal device, and the PRACH configuration information comprises a PRACH format and a time advance for a PRACH sending time relative to downlink frame timing of the terminal device.

2. The method according to claim 1, wherein the PRACH format comprises at least one of following parameters: a subcarrier spacing, a cyclic prefix (CP) length, or a sequence length.

3. The method according to claim 1, wherein sending the PRACH configuration information to a terminal device in the specified region by using at least one of: broadcast signaling, multicast signaling, or dedicated signaling of the terminal device.

4. The method according to claim 3, wherein the broadcast signaling comprises at least one of following signaling: master system information block (MIB) broadcast signaling or system information block (SIB) broadcast signaling;
  the multicast signaling comprises at least one of following signaling: multicast signaling carried on a physical downlink shared channel (PDSCH) or common downlink control information (DCI) multicast signaling carried on a physical downlink control channel (PDCCH);
  the dedicated signaling of the terminal device comprises at least one of following signaling: radio resource control (RRC) signaling, media access control (MAC) control element (CE) signaling, or downlink control information (DCI) signaling.

5. The method according to claim 1, further comprising:
  determining the time advance for the PRACH sending time and the PRACH format according to related information of a satellite and the specified region;
  wherein the related information of the satellite comprises at least one of following information: ephemeris information of the satellite or height information of the satellite.

6. The method according to claim 5, wherein determining the time advance for the PRACH sending time and the PRACH format according to related information of a satellite and the specified region comprises at least one of:
  determining, wherein the specified region is the coverage region of a specified beam, the time advance for the PRACH sending time and the PRACH format according to the related information of the satellite and the coverage region; or
  determining, wherein the specified region is the positioning region of a specified terminal device, the time advance for the PRACH sending time and the PRACH format according to the related information of the satellite and the positioning region.

7. A non-transitory computer-readable storage medium, configured to store with an instruction, wherein, when the instruction is executed by a processor, the method according to claim 1 is performed.

8. A method for configuring a physical random access channel (PRACH), performed by a terminal device in a specified region, wherein the method comprises:
  receiving PRACH configuration information in the specified region sent by a network device, wherein the specified region is determined by the network device according to a difference between round trip delays (RTD) of terminal devices, the specified region comprises a coverage region of a specified beam or a positioning region of a specified terminal device, and the PRACH configuration information comprises a PRACH format and a time advance for a PRACH sending time relative to downlink frame timing of the terminal device.

9. The method according to claim 8, wherein the PRACH format comprises at least one of following parameters: a subcarrier spacing, a cyclic prefix (CP) length, or a sequence length.

10. The method according to claim 8, wherein receiving the PRACH configuration information in the specified region sent by the network device by using at least one of: broadcast signaling, multicast signaling, or dedicated signaling of the terminal device.

11. The method according to claim 10, wherein the broadcast signaling comprises at least one of following signaling: master system information block (MIB) broadcast signaling or system information block (SIB) broadcast signaling;
  the multicast signaling comprises at least one of following signaling: multicast signaling carried on a physical downlink shared channel (PDSCH) or common downlink control information (DCI) multicast signaling carried on a physical downlink control channel (PDCCH);
  the dedicated signaling of the terminal device comprises at least one of following signaling: radio resource control (RRC) signaling, media access control (MAC) control element (CE) signaling, or downlink control information (DCI) signaling.

12. The method according to claim 8, further comprising:
  determining a PRACH sending time point according to the time advance for the PRACH sending time and the downlink frame timing of the terminal device; and
  sending PRACH information at the PRACH sending time point according to the PRACH format.

13. An apparatus for configuring a physical random access channel (PRACH), comprising a processor and a memory, wherein a computer program is stored in the memory, and the processor executes the computer program stored in the memory to enable the apparatus to execute the method according to claim 8.

14. A non-transitory computer-readable storage medium, configured to store with an instruction, wherein, when the instruction is executed by a processor, the method according to claim 8 is performed enabled to be implemented.

15. An apparatus for configuring a physical random access channel (PRACH), comprising a processor and a memory, wherein a computer program is stored in the memory, and the processor executes the computer program stored in the memory to enable the apparatus to:
  send PRACH configuration information to a terminal device in a specified region, wherein the specified region is determined according to a difference between round trip delays (RTD) of terminal devices, the specified region comprises a coverage region of a specified beam or a positioning region of a specified terminal device, and the PRACH configuration information comprises a PRACH format and a time advance for a PRACH sending time relative to downlink frame timing of the terminal device.

16. The apparatus according to claim 15, wherein the PRACH format comprises at least one of following parameters: a subcarrier spacing, a cyclic prefix (CP) length, or a sequence length.

17. The apparatus according to claim 15, wherein the PRACH configuration information is sent to a terminal device in the specified region by using at least one of: broadcast signaling, multicast signaling, or dedicated signaling of the terminal device.

18. The apparatus according to claim 17, wherein the broadcast signaling comprises at least one of following signaling: master system information block (MIB) broadcast signaling or system information block (SIB) broadcast signaling;
  the multicast signaling comprises at least one of following signaling: multicast signaling carried on a physical downlink shared channel (PDSCH) or common downlink control information (DCI) multicast signaling carried on a physical downlink control channel (PDCCH);

the dedicated signaling of the terminal device comprises at least one of following signaling: radio resource control (RRC) signaling, media access control (MAC) control element (CE) signaling, or downlink control information (DCI) signaling.

19. The apparatus according to claim 15, the apparatus is further enabled to:

determine the time advance for the PRACH sending time and the PRACH format according to related information of a satellite and the specified region;

wherein the related information of the satellite comprises at least one of following information: ephemeris information of the satellite or height information of the satellite.

20. The apparatus according to claim 19, the apparatus is further enabled to perform at least one of:

determining, wherein the specified region is the coverage region of a specified beam, the time advance for the PRACH sending time and the PRACH format according to the related information of the satellite and the coverage region; or determining, wherein the specified region is the positioning region of a specified terminal device, the time advance for the PRACH sending time and the PRACH format according to the related information of the satellite and the positioning region.

* * * * *